United States Patent
Kondamari et al.

(10) Patent No.: US 11,574,393 B2
(45) Date of Patent: Feb. 7, 2023

(54) CAMERA INTEGRITY CHECKS IN A VIDEO SURVEILLANCE SYSTEM

(71) Applicant: Honeywell International Inc., Morris Plains, NJ (US)

(72) Inventors: Raja Pratap Kondamari, Bangalore (IN); Raja Sekhar Kommoju, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/915,520

(22) Filed: Jun. 29, 2020

(65) Prior Publication Data
US 2021/0004950 A1 Jan. 7, 2021

Related U.S. Application Data

(60) Provisional application No. 62/871,011, filed on Jul. 5, 2019.

(51) Int. Cl.
*G06T 7/00* (2017.01)
*H04N 7/18* (2006.01)

(52) U.S. Cl.
CPC .......... *G06T 7/0002* (2013.01); *H04N 7/181* (2013.01); *G06T 2207/10016* (2013.01); *G06T 2207/30168* (2013.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 7,146,052 | B2 * | 12/2006 | Sugimura | G08B 13/19645 348/E7.086 |
| 8,872,917 | B1 * | 10/2014 | Rozenboim | H04N 5/913 348/143 |
| 10,755,543 | B1 * | 8/2020 | Usie | G08B 13/19634 |
| 2005/0162516 | A1 * | 7/2005 | Loepfe | G06T 7/44 348/156 |

(Continued)

FOREIGN PATENT DOCUMENTS

| | | |
|---|---|---|
| JP | 2011259304 A | 12/2011 |
| WO | WO-2020130798 A1 * | 6/2020 |

OTHER PUBLICATIONS

Canny, "A Computational Approach to Edge Detection," IEEE Transactions on Pattern Analysis and Machine Intelligence, vol. 8, No. 6, 20 pages, Nov. 1986.

(Continued)

*Primary Examiner* — Delomia L Gilliard
(74) *Attorney, Agent, or Firm* — Seager, Tufte & Wickhem, LLP

(57) ABSTRACT

A method of performing an integrity check on a plurality of video surveillance cameras includes retrieving a recent video frame from each of the plurality of video surveillance cameras, determining a integrity score for each of the recent video frames and determining which of the integrity scores failed to meet a predetermined criteria. When at least one of the integrity scores fails to meet the predetermined criteria, an integrity check report is created that includes an camera identifier along with the recent video frame for each of the plurality of video surveillance cameras that had a recent video frame with an integrity score that failed to meet the predetermined criteria. The integrity check report is displayed to a user for manual verification.

9 Claims, 12 Drawing Sheets

(56) References Cited

U.S. PATENT DOCUMENTS

| | | | | |
|---|---|---|---|---|
| 2008/0303903 | A1* | 12/2008 | Bentley | G08B 13/19676 348/E7.086 |
| 2009/0040303 | A1* | 2/2009 | Finn | H04N 17/002 348/192 |
| 2009/0040330 | A1 | 2/2009 | Finn et al. | |
| 2009/0231428 | A1* | 9/2009 | Suzuki | G08B 13/19673 702/182 |
| 2012/0026326 | A1* | 2/2012 | Itoh | G06V 10/30 348/143 |
| 2012/0069190 | A1* | 3/2012 | Nam | H04N 7/181 348/E7.086 |
| 2013/0120138 | A1* | 5/2013 | Hicks, III | G08B 25/014 340/538 |
| 2015/0085115 | A1* | 3/2015 | Sternberg | H04N 17/004 348/143 |
| 2015/0131964 | A1* | 5/2015 | Liu | G08B 13/19665 386/226 |
| 2015/0244989 | A1* | 8/2015 | Liao | H04N 5/247 348/159 |
| 2016/0125247 | A1* | 5/2016 | Fan Chiang | G06F 16/5838 382/103 |
| 2019/0313061 | A1* | 10/2019 | Carey | H04N 21/2347 |

OTHER PUBLICATIONS

Open CV, Feature Matching, Accessed on Jun. 30, 2020.

Pech-Pacheco et al; "Diatom Autofocusing in Brightfield Microscopy: A Comparative Study," IEEE, pp. 314-317, 2000.

Ying Liu et al; "On Over-Exposed Region Detection with Regularized Logistic Regression," 2017, IEEE Explore, Accessed on Jun. 30, 2020.

* cited by examiner

CAMERA INTEGRITY CHECKS IN A VIDEO SURVEILLANCE SYSTEM

The present application claims the benefit of priority to U.S. Provisional Patent Application No. 62/871,011, filed Jul. 5, 2019, titled, "CAMERA INTEGRITY CHECKS IN A VIDEO SURVEILLANCE SYSTEM", which is hereby incorporated by reference.

TECHNICAL FIELD

The present disclosure relates generally to a video surveillance system that include a plurality of video cameras. More particularly, the present disclosure relates to methods and systems for performing camera integrity checks on each of a plurality of video cameras within a video surveillance system.

BACKGROUND

Known video surveillance systems often include a large number of video cameras that are used to provide video surveillance across a site. The performance of a video camera may degrade over time for a variety of different reasons. A video camera may accumulate dust on its lens, for example. For a video camera that is mounted outdoors, its aim may be impacted by weather, such as wind, rain and snow. In some cases, a video camera may be negatively impacted by either too much light or not enough light in the immediate vicinity of the video camera. A video camera that is mounted at a height that is reachable by an individual may be accidentally or intentionally obscured, or its field of view may be changed. These are just a few examples of how the performance of a video camera may degrade over time. In systems that include tens, hundreds or even thousands of video cameras, performing integrity checks on all of the cameras typically require substantial manual resources by security personnel. What would be desirable is a method and system that can efficiently perform integrity checks on each of a plurality of such surveillance cameras on a routine basis.

SUMMARY

The present disclosure relates generally to a video surveillance system that include a plurality of video cameras. More particularly, the present disclosure relates to methods and systems for performing camera integrity checks on each of a plurality of video cameras within a video surveillance system. In an example of the present disclosure, a method of performing an integrity check on a plurality of video surveillance cameras includes retrieving a recent video frame from each of the plurality of video surveillance cameras and determining a integrity score for each of the recent video frames. The illustrative method further includes determining which of the integrity scores failed to meet a predetermined criteria. An integrity check report is then created when at least one of the integrity scores failed to meet the predetermined criteria. The integrity check report may include an camera identifier along with the recent video frame for each of the plurality of video surveillance cameras that had a recent video frame with an integrity score that failed to meet the predetermined criteria. The integrity check report may be displayed to a user for manual verification and intervention if appropriate.

In another example of the present disclosure, a method of performing an integrity check on a plurality of video surveillance cameras includes retrieving a recent video frame from each of the plurality of video surveillance cameras and determining a integrity score for each of the recent video frames. The illustrative method further includes determining which of the integrity scores failed to meet a predetermined criteria and alerting a user to those of the plurality of video surveillance cameras that produced a recent video frame with an integrity score that failed to meet the predetermined criteria.

In another example of the present disclosure, a method of performing on-demand integrity checks on a plurality of video surveillance cameras includes grouping the plurality of video surveillance cameras into at least a first group in which the video surveillance cameras in the first group share a camera attribute value and a second group in which the second group share a camera attribute value different from that of the first group. The camera attribute value may a priority value, a mounting location value, and/or any other suitable attribute value. A request may be received from a user to perform an integrity check on either the first group of video surveillance cameras or the second group of video surveillance cameras. For each of the video surveillance cameras in the requested group, a recent video frame may be captured and analyzed to determine a measure related to one or more of blur, blockage and exposure. An integrity score for each of the recent video frames may be determined based at least in part on the measure related to one or more of blur, blockage and exposure and may be compared to an integrity score criteria. Each of the video surveillance cameras in the requested group where the corresponding recent video frame had an integrity score that did not meet the integrity score criteria may be reported to the user.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
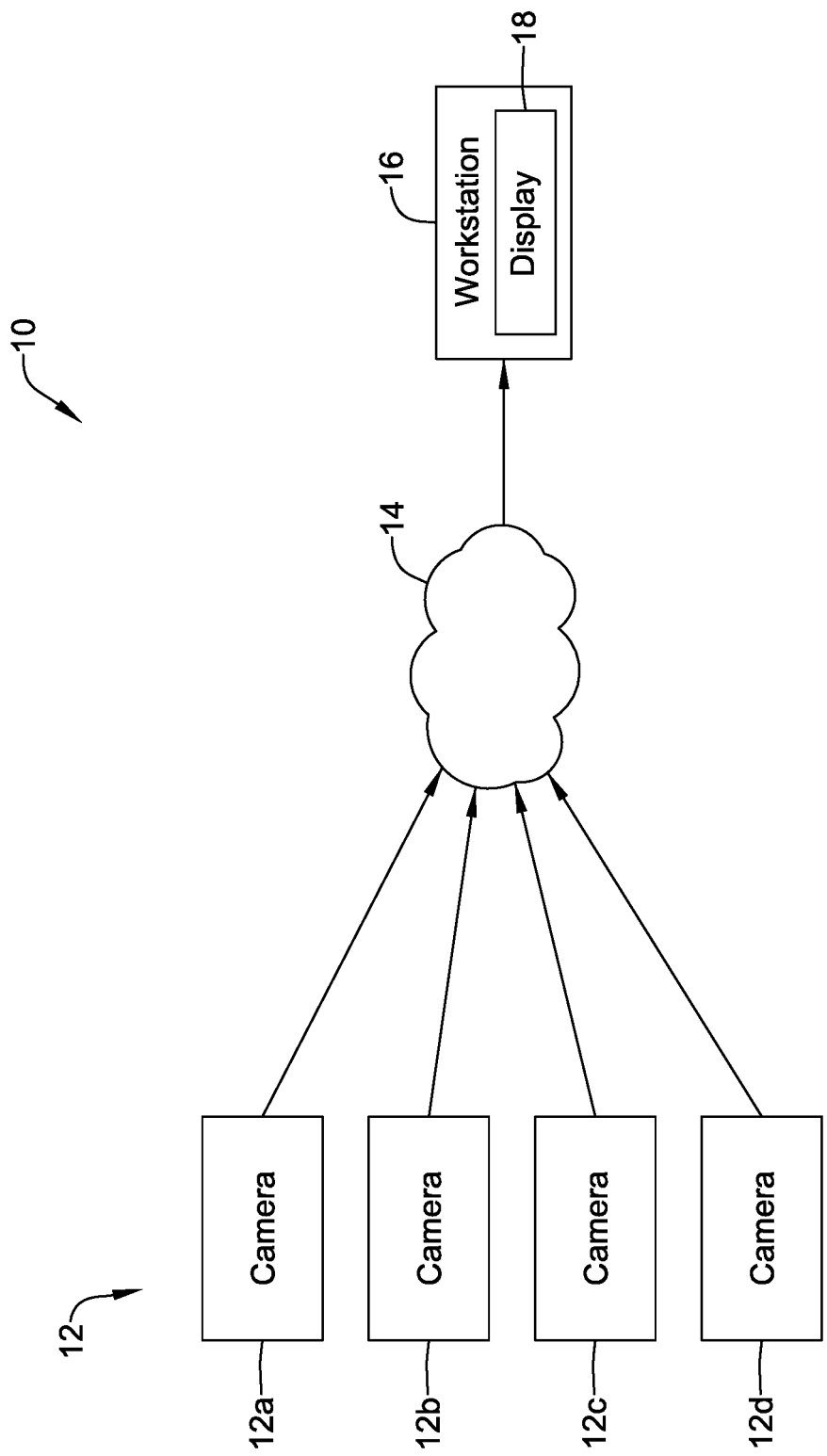
FIG. 1 is a schematic block diagram of an illustrative video surveillance system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

The present disclosure relates generally to video surveillance systems that include a plurality of video cameras. FIG. 1 is a schematic block diagram of a video surveillance system 10 that includes a plurality of cameras 12. While a total of four cameras 12a, 12b, 12c, 12d are shown, it will be appreciated that this is merely illustrative, as the video surveillance system 10 may include any number of cameras 12. For example, the video surveillance system 10 may include tens, hundreds or even thousands of cameras 12. While the cameras 12 are described as video cameras that each provide a video stream, in some cases at least some of the cameras 12 may be still cameras that capture still images, perhaps on a particular schedule or in response to detected motion.

In some instances, the images or video streams captured by each of the cameras 12 may be transmitted to a server 14. In some cases, the server 14 may provide live video streams to a workstation 16, and may store or archive some or all of the video streams for later review. While the server 14 is illustrated as being a cloud server, this is not necessary in all cases. The server 14 may represent a single computer, or the server 14 may represent a large number of computers that are networked together. Some of the cameras 12 may be hard wired to a device such as a computer, a router or a modem, that itself communicates with the server 14. Some of the cameras 12 may communicate wirelessly with the server 14, using any desired wireless communication protocol such as but not limited to cellular communication, ZigBee, RED-LINK™, Bluetooth, WiFi, IrDA, dedicated short range communication (DSRC), EnOcean, and/or any other suitable common or proprietary wireless protocol, as desired.

The workstation 16 may be in communication with the server 14 such that the images or video streams captured by each of the cameras 12 may be accessed by the workstation 16 and viewed on a display 18 of the workstation 16. In some instances, the workstation 16 may be used to control one or more of the cameras 12, or to adjust one or more of the cameras 12. In some cases, the workstation 16 and/or the server 14 may, either separately or in combination, provide a way for an individual such as a security officer, to view footage captured by one or more of the cameras 12. In some instances, as will be discussed, one or more of the workstation 16 and/or the server 14, either separately or in combination, may be used to perform integrity checks on one or more of the cameras 12 from time to time. Integrity checks may be performed automatically sometimes on a schedule, on an on-demand basis, and/or in any other suitable manner. Integrity checks may be performed to ascertain whether one or more of the cameras 12 have a degraded performance. It is desirable to identify those cameras 12 that have a degraded performance early, before a security event occurs where video from the camera 12 might be critical to document the security event.

It will be appreciated that camera performance may be degraded for any of a number of reasons. The cameras 12 may be placed in any number of different locations and positions. Some of the cameras 12 may be located outside, such as secured to the exterior of a building, or disposed on light posts, for example. It will be appreciated that the cameras 12 that are located outside may be susceptible to weather. For cameras 12 that are located outdoors, the lens of each of the cameras 12 may be partially obscured by rain or snow. Dust may collect on the lens. In some cases, wind may cause one or more of the cameras 12 to become misaligned relative to a desired or original alignment of the camera 12. A camera 12 may be aligned to capture activity at or near a door, for example. Over time, a prevailing wind or a severe storm may cause the camera 12 to shift its alignment enough that the camera 12 no longer captures activity at or near the door. Some cameras 12, depending on where they are located, may be susceptible to damage caused by vandalism. If a camera 12 is within reach, an individual may cover its lens, or substantially change its alignment such that the camera 12 does not capture particular activity. A camera 12 located near an ATM, for example, may have its lens painted, or its aim substantially changed, so that the camera 12 no longer captures activity at or near the ATM. An individual may do this, for example, if they intend to interfere with operation of the ATM by installing a card skimmer, or even attempting to directly rob cash from the ATM. In some instances, an object such as a ceiling tile or piece of furniture may be moved and obscure or block part or all of the field of view of a camera. In some instances, a light may be installed at the request of an occupant, but the light may shine directly into the camera lens. This can saturate the camera sensor causing poor image quality. These are just some examples of ways the camera performance may be degraded over time.

In some cases, an integrity check may look at recent captured video frames for one or more of blur, blind and field of view. Blur may occur, for example, as a result of dust accumulating on a camera lens. Blur may also occur as a result of the camera lens being wet as a result of rain or snow. Blind may occur if there is an unexpected light source close to the camera 12 that results in over exposure, thereby washing out the image(s) captured by a particular camera 12. Blind may occur if there is an unexpected loss of light near the camera 12 that results in under exposure, thereby causing a dark image in which detail is hard to see. Blind may occur if there is an unexpected object physically blocking at least part of the field of view of the camera 12. Changes to the field of view of a particular camera 12 may occur as a result of wind that causes the particular camera 12 to rotate, or to tilt up or down. Changes to the field of view of a particular camera 12 may occur as a result of changes to the structure to which the particular camera 12 is mounted. For example, a camera 12 that is mounted to a light post in a parking lot may suffer a change in the field of view of the camera 12 after a vehicle accidently backs into the light post and causes the light post to become bent or tilted.

In some cases, one or more captured video frames (or still images) may be analyzed using one or more algorithms that produce one or more of a blur score, a blind score and a field of view score for the camera 12 that produced the one or more captured video frames. A variety of algorithms may be used to determine a blur score. For example, a well-focused image is expected to have a high variation in gray levels. Accordingly, a numerical representation of the variation in gray levels within an image may be calculated. As another example, a well-focused image is expected to have sharper edges. A numerical representation of edge sharpness within the image may be calculated, such as using the Tenengrad method. There are also second derivative methods that may be used for providing a numerical representation of edge sharpness within the image. Any of a variety of different algorithms, including these and others, may be used in ascertaining a blur score for an image captured by a particular camera 12.

With respect to determining a blind score, any number of different suitable algorithms may be used. In some cases, a blind score may be ascertained simply by comparing a current field of view of the camera 12 with a previous field of view of the camera 12, thereby revealing portions of the field of view of the camera 12 that are partially or completely blocked by one or more objects that were not originally in a location in which they interfered with the field of view of the camera 12. As an example, say someone in a cubicle has a birthday, and someone has given them one or more Happy Birthday helium balloons. Depending on how long the strings are on the helium balloons, one or more of the balloons may be blocking a portion of the field of view of a particular camera 12. In some cases, the blind score may also be influenced by relative light levels near a particular camera 12. Exposure may be determined, for example, by looking at light exposure levels as well as histogram methods. As a non-limiting but illustrative example, a blind score (in particular, over-exposure) for a particular camera 12 may be ascertained via L2 regularized logistic regression.

In some cases, feature extraction from a video frame can provide data pertaining to illumination, intensity histogram and/or contrast. The illumination data may be a value indicating a total intensity of the video image being analyzed. An intensity histogram may be a distribution of intensity values within an image. Contrast ratio data may be a difference between the darkest pixel in the image and the lightest pixel in the image. These and these values may be useful in analyzing the captured video frame as a part of calculating an intensity score.

In some cases, a particular camera 12 may have a field of view score that is calculated by comparing a current field of view with an original field of view that was captured when the camera 12 was initially installed, for example. In some instances, a scene dissimilarity score, such as may be obtained using edge detection or a brute force matching method in which individual items are found in a video frame such as but not limited to an original field of view video frame, and then found once again in a more recent video frame. Changes in the relative position of the individual items provides an indication of whether and if so, how much, the field of view of the particular camera 12 may have changed over time.

An integrity score may be determined, for example, by simply adding together a blur score, a blind score and/or a scene dissimilarity (change in field of view) to obtain a numerical result. In some cases, one of the individual scores (blur, blind or exposure, scene dissimilarity) may be more important, and thus may be weighted relatively more when adding the scores together. In some instances, the weighting may be based at least in part upon a particular camera attribute value for that camera 12, or for that group of cameras 12. As an example, the integrity score may be calculated using equation 1:

$$\text{Integrity Score} = w1*\text{BlurScore} + w2*\text{BlindScore} + w3*\text{PositionScore} \quad (1).$$

In this, w1, w2 and w3 are selected in order to weight the relative scores as desired, and w1, w2 and w3 add up to 1. In some cases, the relative values of w1, w2 and w3 may change over time in response to indications of false positives or false negatives, for example.

It will be appreciated that camera location can play a significant role in the relevant weighting of the BlurScore, the BlindScore and the Position Score. To illustrate, for outdoor cameras, the PositionScore be most important, and thus w3 may have the highest value as these cameras are subject to weather. For indoor cameras, the BlindScore may be most important, and thus w2 may have the highest value. To put another way, in some cases, for outdoor cameras it may be appropriate to think of the weighting as w3>w2>w1. For indoor cameras that are ceiling mounted, it may be appropriate to think of the weighting as w2>w1>w3, as it is relatively less likely that these cameras have been inadvertently moved or tilted. For indoor cameras that are mounted at lower heights, such as in an ATM kiosk, it may be appropriate to think of the weighting as w2>w3>w1. In any event, it may be considered that w1 ranges from 0.1 to 0.8, w2 ranges from 0.1 to 0.8 and w3 ranges from 0.1 to 0.8, with the caveat that w1+w2+w3=1. These are just examples. Also, it is contemplated that other integrity scores may be calculated beyond the illustrative Blur, Blind and Position scores, such as a vibration score that indicates how much vibration a camera is experiencing, a burned out pixel score that indicates a number of pixels of the camera sensor that are burned out, a flicker score that indicates a level of flicker in the captured image, a pixilation score that indicates a level of pixilation in the captured image, and/or any other suitable camera integrity score.

Figure 2:
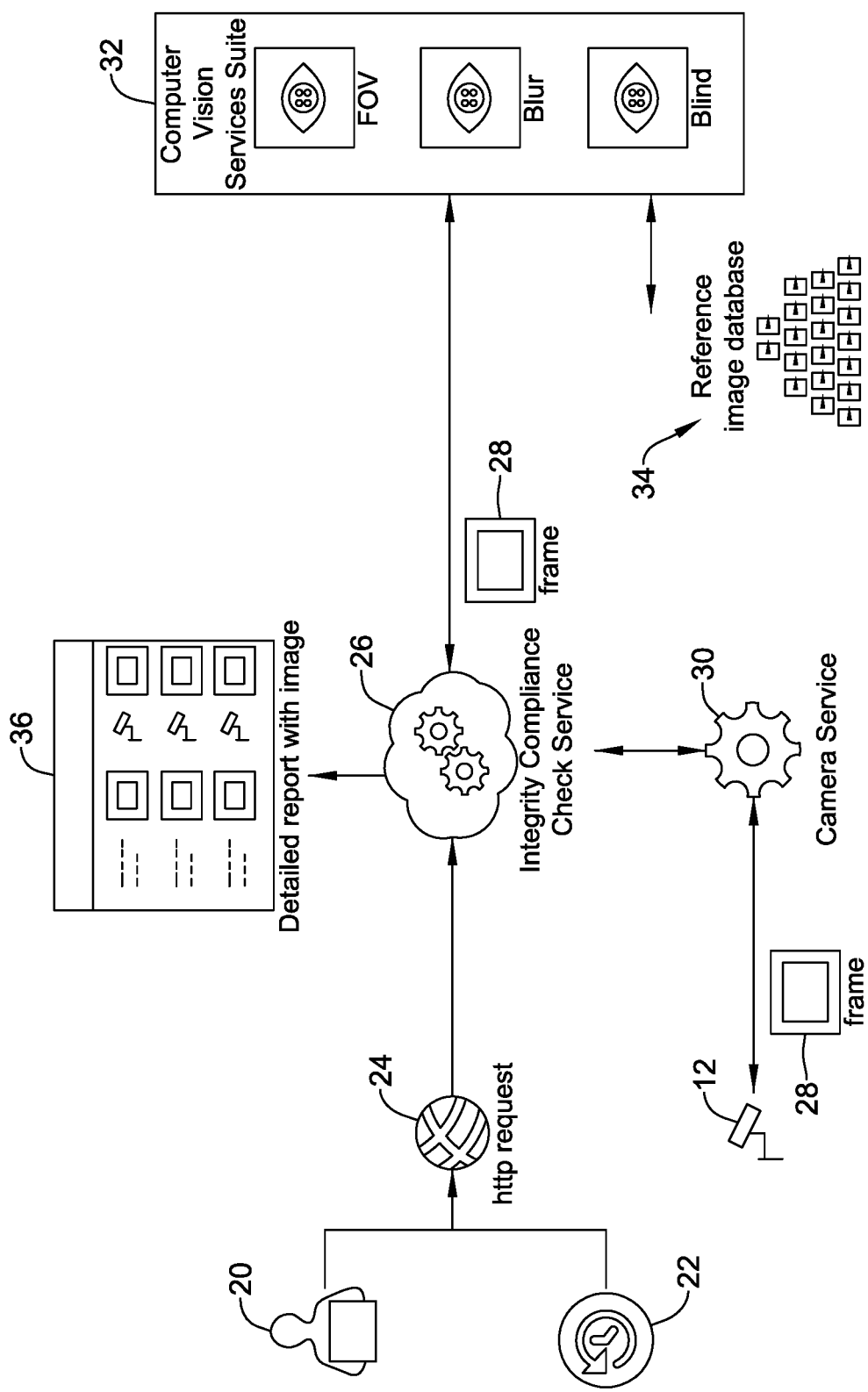
FIG. 2 is a schematic diagram showing how illustrative integrity checks may be implemented in the illustrative video surveillance system of FIG. 1.

FIG. 2 is a schematic diagram showing how an integrity check may be implemented in the illustrative video surveillance system 10 (FIG. 1). To begin with, an integrity check may be initiated by an operator, indicated at 20, perhaps in response to discovering that the video quality provided by one or more of the cameras 12 has degraded. The operator 20 may initiate an integrity check for any of a number of reasons. For example, the operator 20 may initiate an integrity check for one or more cameras 12 that are located outdoors after a storm. In another example, the operator 20 may initiate an integrity check for one or more cameras in an area of a building that is currently being remodeled by a construction crew. In some cases, an integrity check may be initiated automatically as a scheduled activity, indicated at 22. For example, a particular camera 12 or a particular group of cameras 12 may undergo a scheduled integrity check once a week, or once a month, or once a year. The scheduling period may vary. As a result of an integrity check being initiated by either the operator 20 or the scheduled activity 22, a request 24 such as an http request may be sent to an Integrity Compliance Check Service 26. In this example, it is assumed that the Integrity Compliance Check Service 26 may be remote from where the cameras 12 (or the operator 20) is located. In some cases, the Integrity Compliance Check Service 26 may reside at least partially in the cloud, but this is not required.

In response to receiving the request 24, the Integrity Compliance Check Service 26 may request current video frames 28 from all of the relevant cameras 12. This may include a single video frame from each of the of the relevant cameras 12, or a series of 3, 5, 10 or more video frames from each of the of the relevant cameras 12. A Camera Service 30 retrieves the current video frames 28 from all of the relevant cameras 12 and provides the current video frames 28 to the Integrity Compliance Check Service 26. In some cases, the Integrity Compliance Check Service 26 then sends the current video frames 28 to a Computer Vision Services Suite 32 for analysis. In some instances, and for each of the current video frames 28, the Computer Vision Services Suite 32 may analyze the current video frames 28 and calculate an integrity score based on a number of algorithms. For example, the Computer Vision Services Suite 32 may, for each of the current video frames 28, calculate a blur score, a blind score and a field of vision or scene similarity score and may combine these individual scores into an integrity score. The integrity score may be reported back to the Integrity Compliance Check Service 26 In some cases, depending on the integrity score, the Integrity Compliance Check Service 26 may implement one or more auto correction services. For example, the auto correction service may change a pan/tilt/zoom setting on a PTZ camera to correct for a poor position score. In another example, the auto correction services may initiate a lens wiper on a suitable equipped camera with a poor blur score to clean dust off its lens. The Integrity Compliance Check Service 26 may also prepare a report as indicated at 36, with pictures (e.g. the current video frames 28), the detected issue and recommended steps for resolution.

Figure 3:
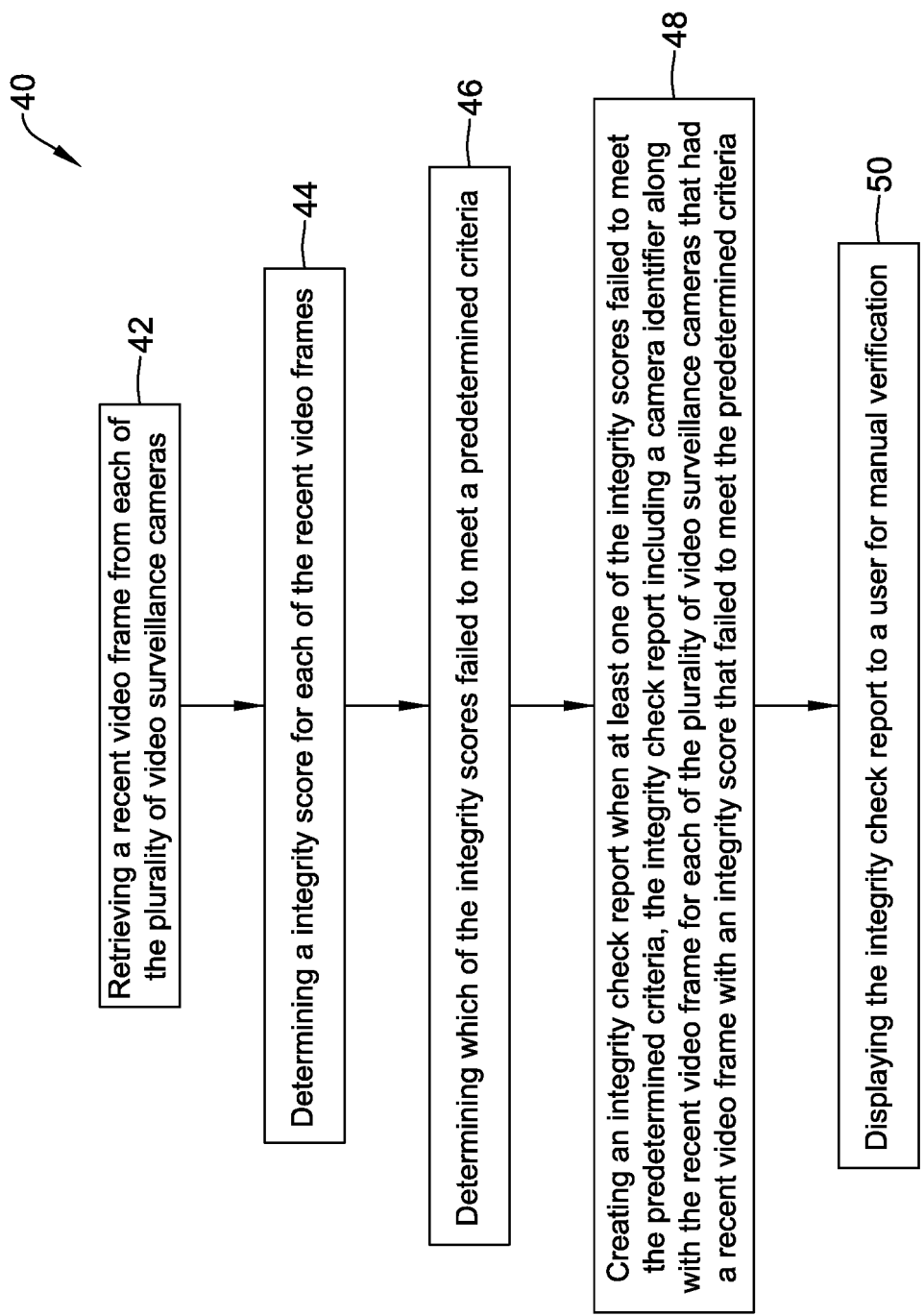
FIG. 3 is a flow diagram showing an illustrative method that may be carried out via the illustrative video surveillance system of FIG. 1.

FIG. 3 is a flow diagram showing an illustrative method 40 for performing an integrity check on a plurality of video surveillance cameras such as the cameras 12. A recent video frame may be retrieved from each of the plurality of video surveillance cameras 12, as indicated at block 42. An integrity score may be determined for each of the recent video frames, as indicated at block 44. In some instances, the integrity score may identify a measure related to blur in the recent video frame. The integrity score may identify a measure related to blockage in the recent video frame. The integrity score may identify a measure related to over exposure or under exposure in the recent video frame. These are just examples. Also, in some cases, the integrity score may include combinations of these measures, for example.

A determination may be made as to which, if any, of the integrity scores failed to meet a predetermined criteria, as indicated at block 46. In some cases, the predetermined criteria may be a predetermined threshold. An integrity check report may be created, as indicated at block 48, when at least one of the integrity scores failed to meet the predetermined criteria. As an example, the integrity check report may include an camera identifier along with the recent video frame for each of the plurality of video surveillance cameras 12 that had a recent video frame with an integrity score that failed to meet the predetermined criteria. In one example, the report may be in a table format, which the camera identifier in a first column, the recent video frame in a second column and the integrity score in a third column. Each of the cameras that has at least one of the integrity score that failed to meet the predetermined criteria may be represented by a corresponding row in the table. This format may make it easy for personnel to quickly scan and identify those cameras that need attention. As indicated at block 50, the integrity check report may be displayed to a user for manual verification.

Figure 4:
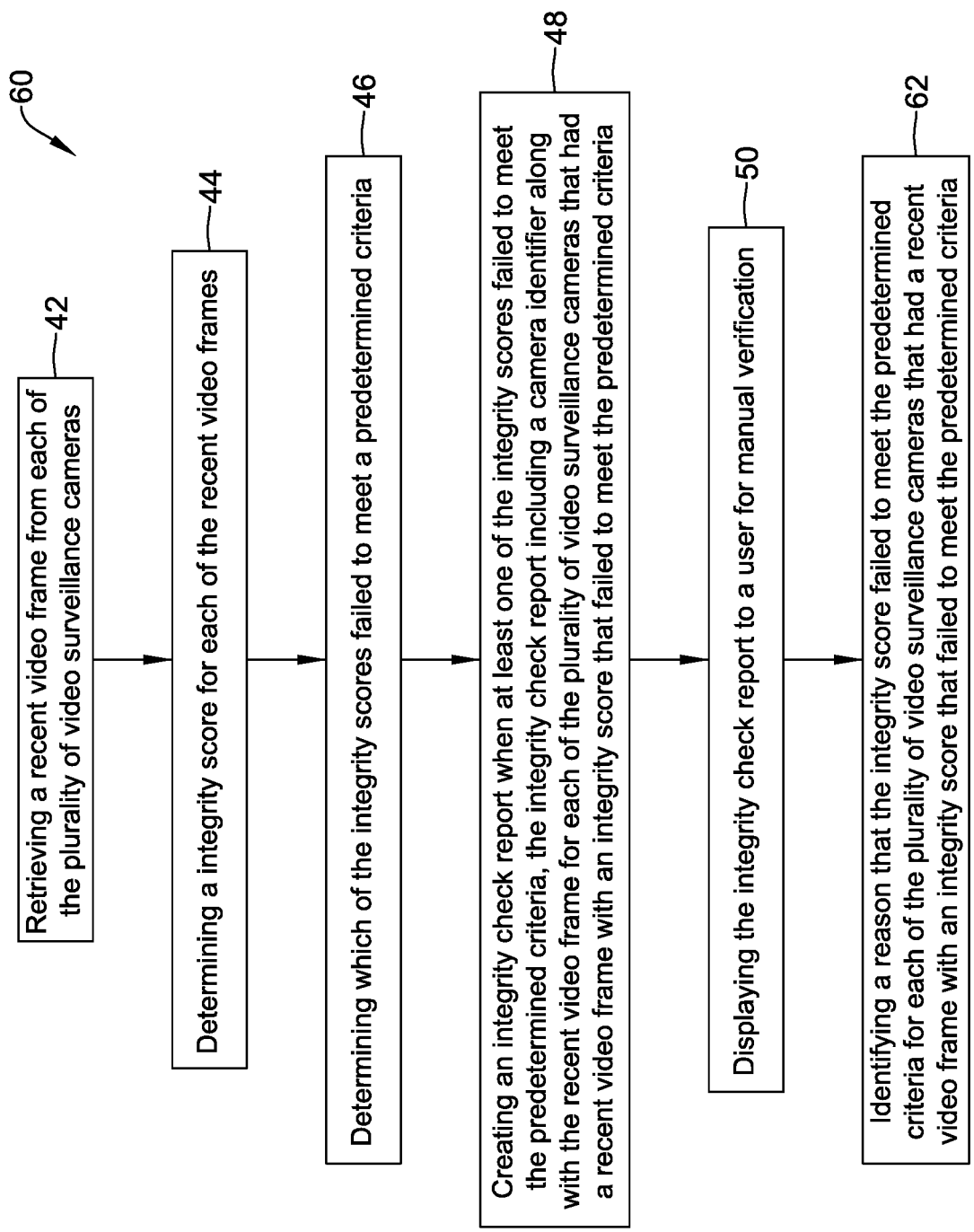
FIG. 4 is a flow diagram showing an illustrative method that may be carried out via the illustrative video surveillance system of FIG. 1.

FIG. 4 is a flow diagram showing an illustrative method 60 for performing an integrity check on a plurality of video surveillance cameras such as the cameras 12. A recent video frame may be retrieved from each of the plurality of video surveillance cameras 12, as indicated at block 42. An integrity score may be determined for each of the recent video frames, as indicated at block 44. In some instances, the integrity score may identify a measure related to blur in the recent video frame. The integrity score may identify a measure related to blockage in the recent video frame. The integrity score may identify a measure related to over exposure or under exposure in the recent video frame. These are just examples. Also, the integrity score may include combinations of these measures, for example.

A determination may be made as to which, if any, of the integrity scores failed to meet a predetermined criteria, as indicated at block 46. An integrity check report may be created, as indicated at block 48, when at least one of the integrity scores failed to meet the predetermined criteria. As an example, the integrity check report may include an camera identifier along with the recent video frame for each of the plurality of video surveillance cameras 12 that had a recent video frame with an integrity score that failed to meet the predetermined criteria. As indicated at block 50, the integrity check report may be displayed to a user for manual verification. As indicated at block 62, a reason may be identified as to why the integrity score failed to meet the predetermined criteria for each of the plurality of video surveillance cameras that had a recent video frame with an integrity score that failed to meet the predetermined criteria. The reason may, for example, include one or more of blur, blind, miss-alignment, under exposure and over exposure. These are just examples. In some cases, the integrity check report indicated at block 50 may include the camera identifier, the reason, and the recent video frame for each of the plurality of video surveillance cameras 12 that had a recent video frame with an integrity score that failed to meet the predetermined criteria.

Figure 5:
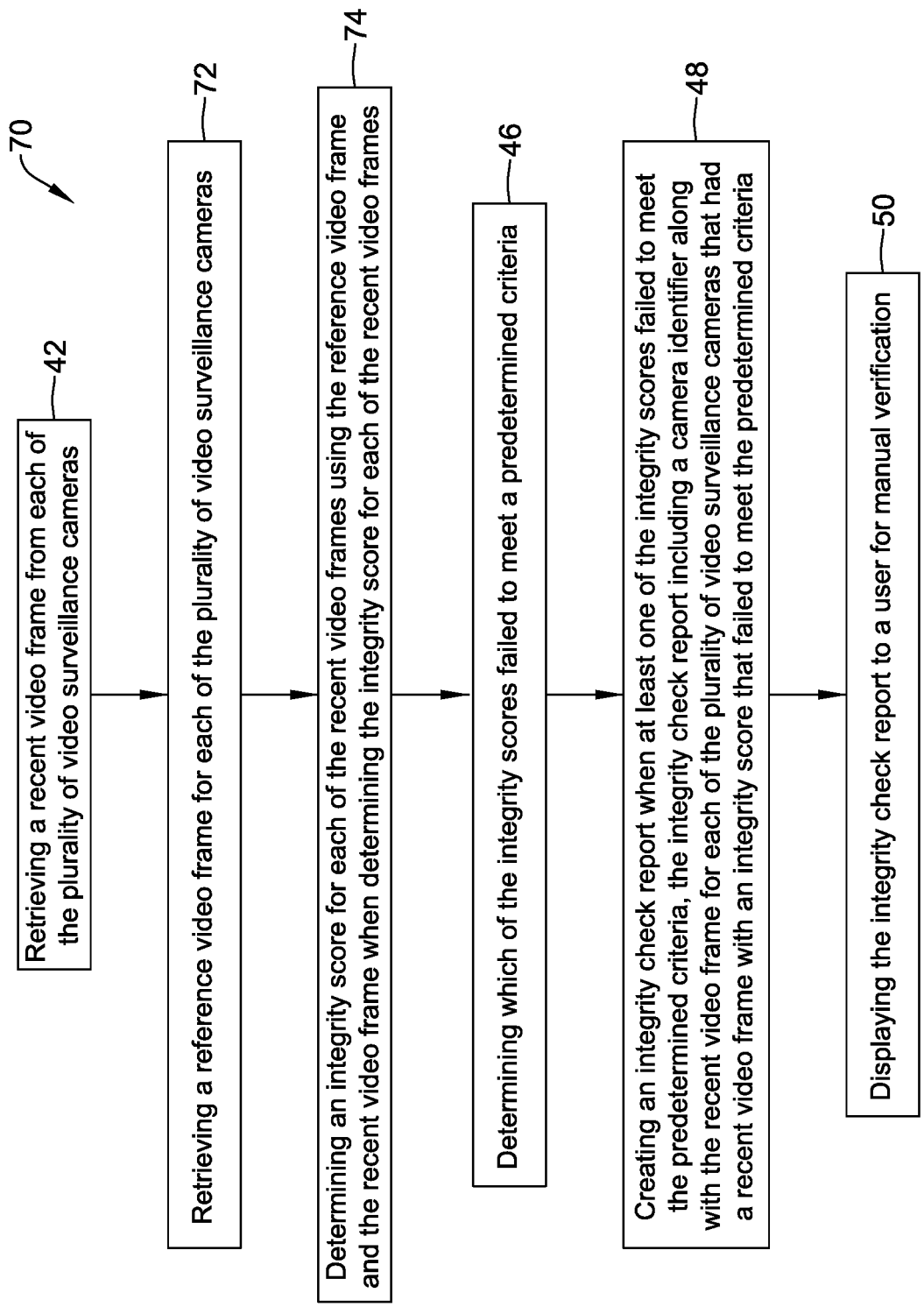
FIG. 5 is a flow diagram showing an illustrative method that may be carried out via the illustrative video surveillance system of FIG. 1.

FIG. 5 is a flow diagram showing an illustrative method 70 for performing an integrity check on a plurality of video surveillance cameras such as the cameras 12. A recent video frame may be retrieved from each of the plurality of video surveillance cameras 12, as indicated at block 42. A reference video frame may be retrieved for each of the plurality of video surveillance cameras 12, as indicated at block 72. In some cases, a reference video frame for a particular camera 12 may be a video frame obtained during initial commissioning of that particular camera 12, during a subsequent calibration or maintenance of the particular camera 12, or during some other time that the particular camera 12 was producing a known good image. The reference video frame may, for example, provide an example of optimal blur, blind and frame of view scores for that particular video camera 12. This may vary depending on the type of camera, quality of image sensor, mounting location and/or other factors. As a result, the reference video frame may be used to compare a current video frame to the reference video frame. An integrity score may be determined for each of the recent video frames using the reference video frame and the recent video frame when determining the integrity score for each of the recent video frames, as indicated at block 74. In some instances, the integrity score may identify a measure related to blur in the recent video frame. The integrity score may identify a measure related to blockage in the recent video frame. The integrity score may identify a measure related to over exposure or under exposure in the recent video frame. The blur, blockage and exposure may be each expressed as a change score representing a change in the blur, blockage and exposure relative to that observed in the reference image. The integrity score may include combinations of these measures, for example.

A determination may be made as to which, if any, of the integrity scores failed to meet a predetermined criteria, as indicated at block 46. In some cases, the predetermined criteria may be a predetermined threshold. An integrity check report may be created, as indicated at block 48, when at least one of the integrity scores failed to meet the predetermined criteria. As an example, the integrity check report may include an camera identifier along with the recent video frame for each of the plurality of video surveillance cameras 12 that had a recent video frame with an integrity score that failed to meet the predetermined criteria. As indicated at block 50, the integrity check report may be displayed to a user for manual verification.

Figure 6:
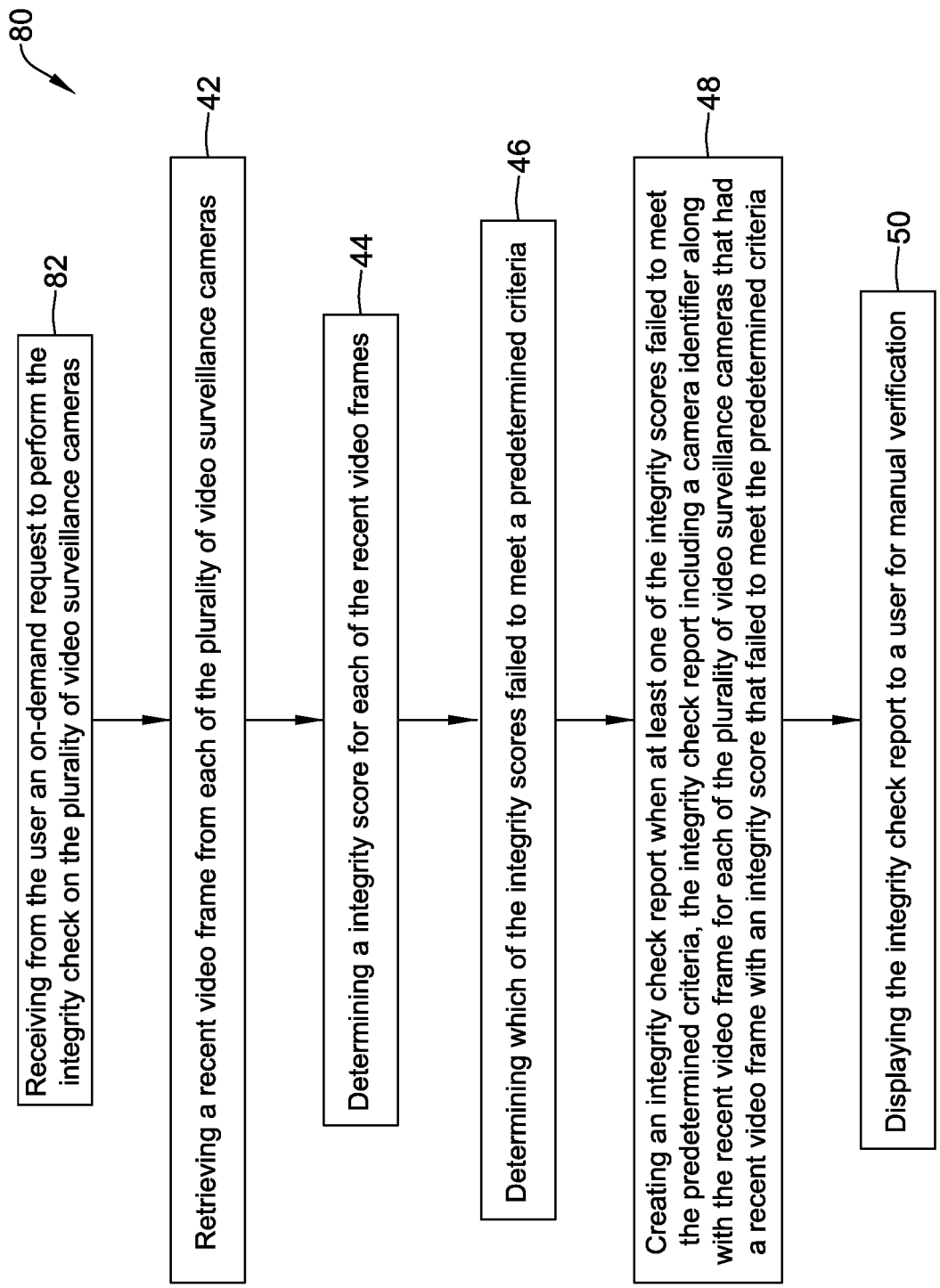
FIG. 6 is a flow diagram showing an illustrative method that may be carried out via the illustrative video surveillance system of FIG. 1.

FIG. 6 is a flow diagram showing an illustrative method 80 for performing an integrity check on a plurality of video surveillance cameras such as the cameras 12. An on-demand request to perform an integrity check on a plurality of video surveillance cameras 12 is received, as indicated at block 82. The on-depend request may be initiated manually by a user (e.g. via the workstation 16). In response, a recent video frame may be retrieved from each of the plurality of video surveillance cameras 12, as indicated at block 42. An integrity score may be determined for each of the recent video frames, as indicated at block 44. In some instances, the integrity score may identify a measure related to blur in the recent video frame. The integrity score may identify a measure related to blockage in the recent video frame. The integrity score may identify a measure related to over exposure or under exposure in the recent video frame. These are just examples. Also, the integrity score may include combinations of these measures, for example.

A determination may be made as to which, if any, of the integrity scores failed to meet a predetermined criteria, as indicated at block 46. In some cases, the predetermined criteria may be a predetermined threshold. An integrity check report may be created, as indicated at block 48, when at least one of the integrity scores failed to meet the predetermined criteria. As an example, the integrity check report may include an camera identifier along with the recent video frame for each of the plurality of video surveillance cameras 12 that had a recent video frame with an integrity score that failed to meet the predetermined criteria. As indicated at block 50, the integrity check report may be displayed to a user for manual verification.

Figure 7:
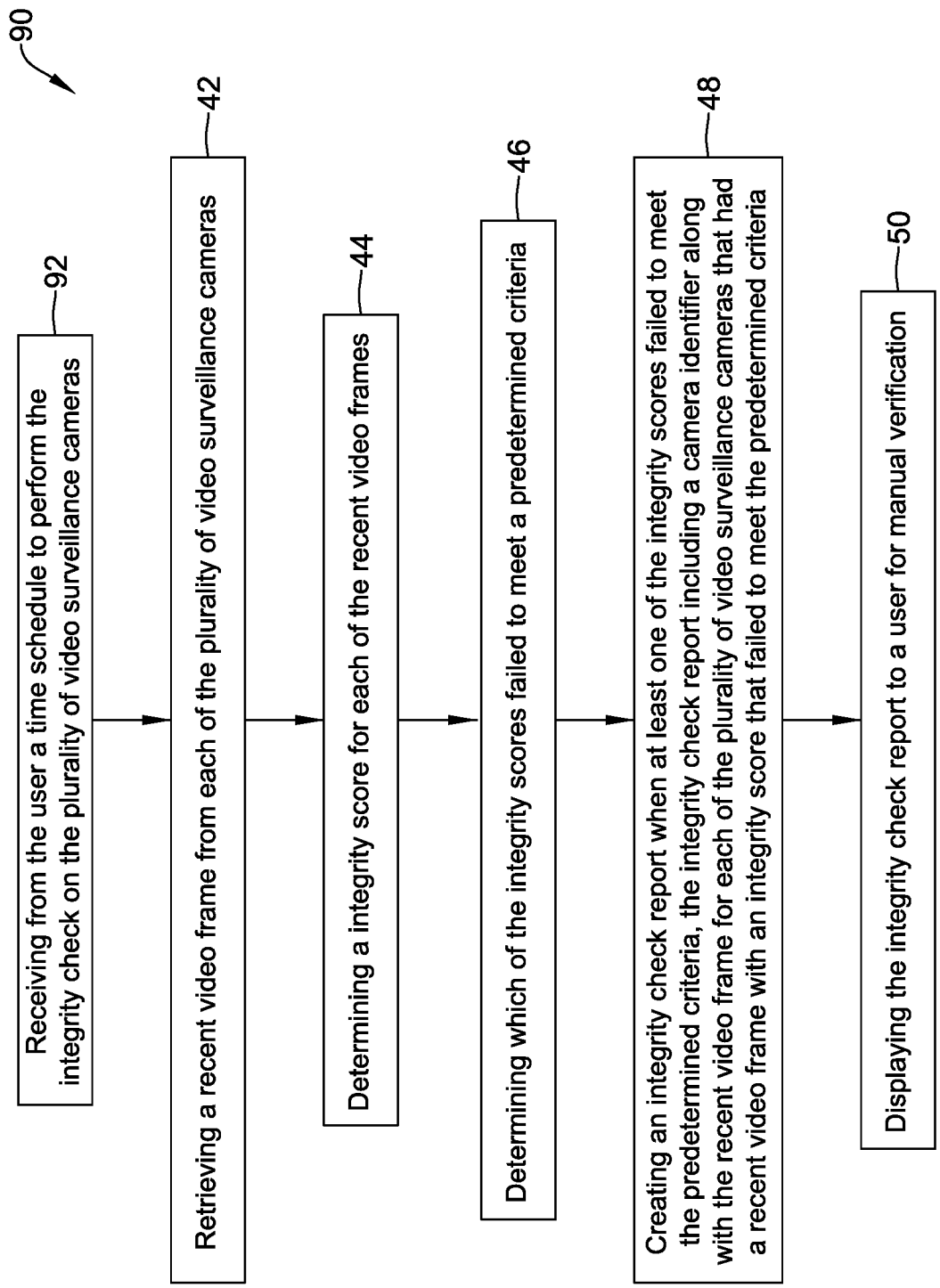
FIG. 7 is a flow diagram showing an illustrative method that may be carried out via the illustrative video surveillance system of FIG. 1.

FIG. 7 is a flow diagram showing an illustrative method 90 for performing an integrity check on a plurality of video surveillance cameras such as the cameras 12. A time schedule may be received from a user for performing integrity checks on a plurality of video surveillance cameras 12, as indicated at block 92. When the schedule indicates that it is time to perform an integrity check, a recent video frame may be retrieved from each of the plurality of video surveillance cameras 12, as indicated at block 42. An integrity score may be determined for each of the recent video frames, as indicated at block 44. In some instances, the integrity score may identify a measure related to blur in the recent video frame. The integrity score may identify a measure related to blockage in the recent video frame. The integrity score may identify a measure related to over exposure or under exposure in the recent video frame. These are just examples. Also, the integrity score may include combinations of these measures, for example.

A determination may be made as to which, if any, of the integrity scores failed to meet a predetermined criteria, as indicated at block 46. In some cases, the predetermined criteria may be a predetermined threshold. An integrity check report may be created, as indicated at block 48, when at least one of the integrity scores failed to meet the predetermined criteria. As an example, the integrity check report may include an camera identifier along with the recent video frame for each of the plurality of video surveillance cameras 12 that had a recent video frame with an integrity score that failed to meet the predetermined criteria. As indicated at block 50, the integrity check report may be displayed to a user for manual verification.

Figure 8:
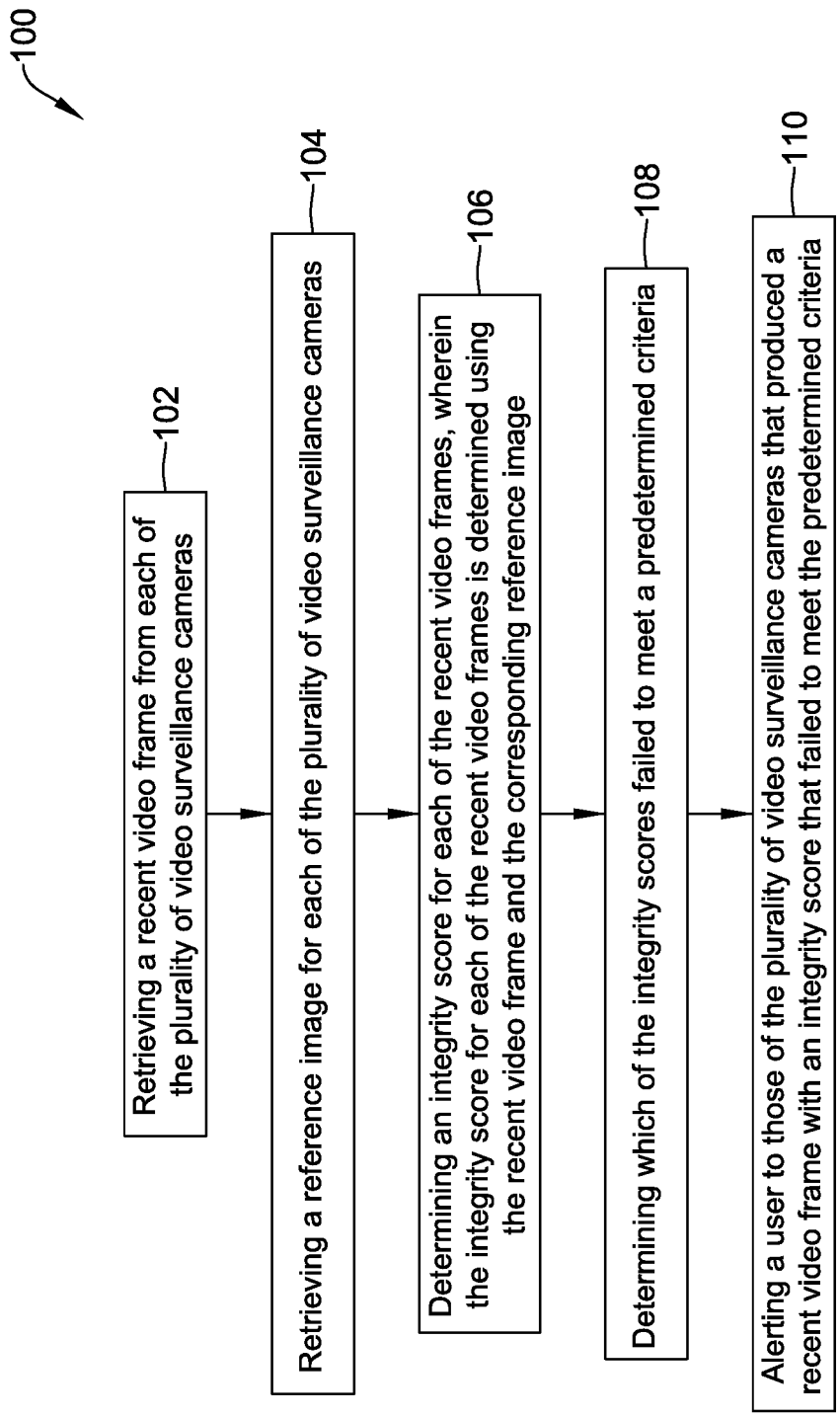
FIG. 8 is a flow diagram showing an illustrative method that may be carried out via the illustrative video surveillance system of FIG. 1.

FIG. 8 is a flow diagram showing an illustrative method 100 of performing an integrity check on a plurality of video surveillance cameras 12. A recent video frame may be retrieved from each of the plurality of video surveillance cameras 12, as indicated at block 102. A reference image may be retrieved for each of the plurality of video surveillance cameras 12, as indicated at block 104. An integrity score may be determined for each of the recent video frames, as indicated at block 106, wherein the integrity score for each of the recent video frames may be determined using the recent video frame and the corresponding reference image. As indicated at block 108, determining which of the integrity scores failed to meet a predetermined criteria may be determined. As noted at block 110, a user may be alerted to those of the plurality of video surveillance cameras that produced a recent video frame with an integrity score that failed to meet the predetermined criteria.

Figure 9:
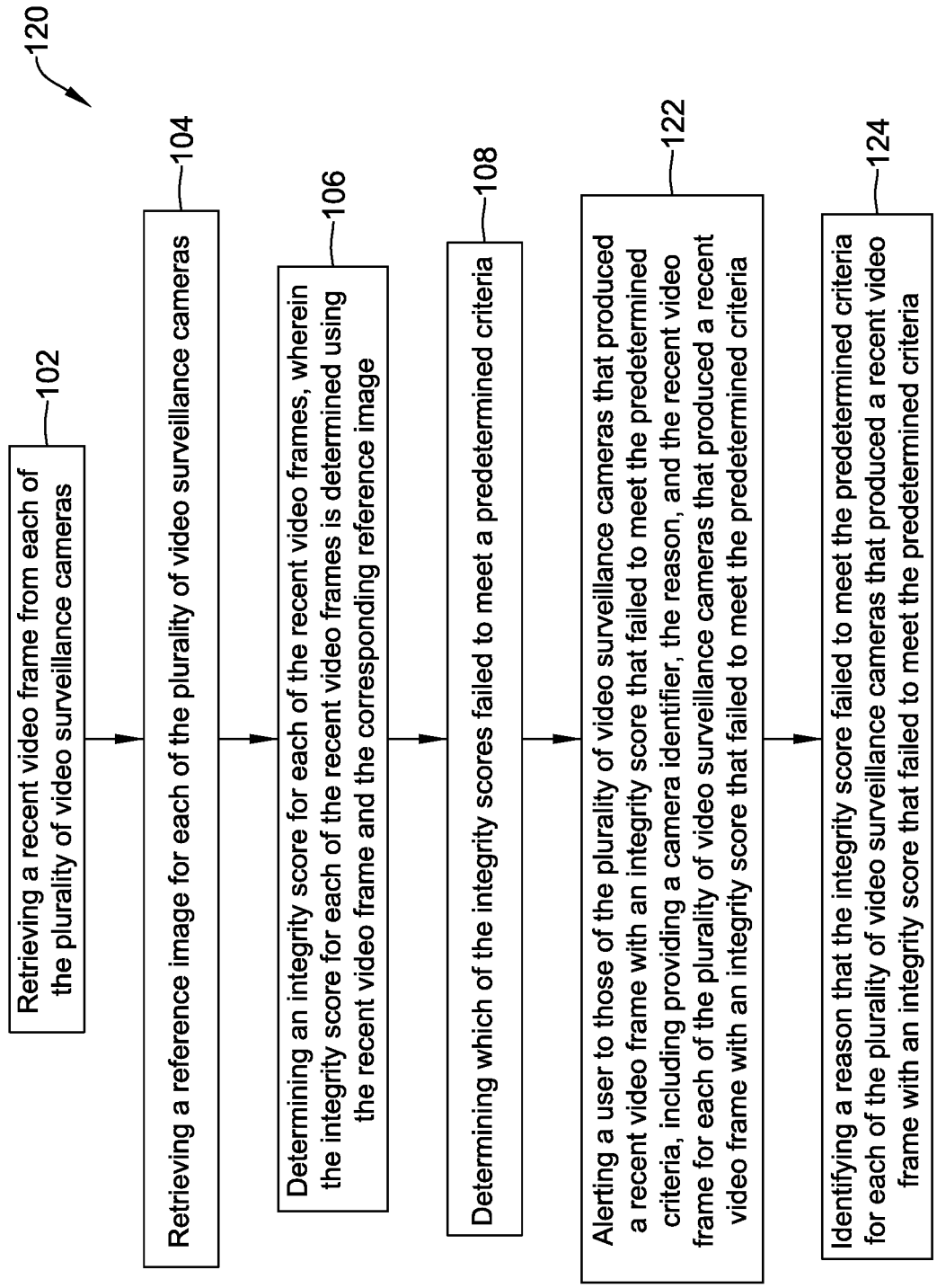
FIG. 9 is a flow diagram showing an illustrative method that may be carried out via the illustrative video surveillance system of FIG. 1.

FIG. 9 is a flow diagram showing an illustrative method 100 of performing an integrity check on a plurality of video surveillance cameras 12. A recent video frame may be retrieved from each of the plurality of video surveillance cameras 12, as indicated at block 102. A reference image may be retrieved for each of the plurality of video surveillance cameras 12, as indicated at block 104. An integrity score may be determined for each of the recent video frames, as indicated at block 106, wherein the integrity score for each of the recent video frames may be determined using the recent video frame and the corresponding reference image. In some cases, as indicated at block 122, the user may be alerted to those of the plurality of video surveillance cameras 12 failed to meet the predetermined criteria. Alerting the user may include providing a camera identifier, the identified reason for failure, and the recent video frame for each of the plurality of video surveillance cameras that produced a recent video frame with an integrity score that failed to meet the predetermined criteria. As indicated at block 124, a reason that the integrity score failed to meet the predetermined criteria may be identified for each of the plurality of video surveillance cameras that produced a recent video frame with an integrity score that failed to meet the predetermined criteria. In some cases, the reason may be one or more of blur, blockage, miss-alignment, under exposure and over exposure, or combinations thereof. These are just examples. In some cases, multiple reasons may be given when applicable.

Figure 10:
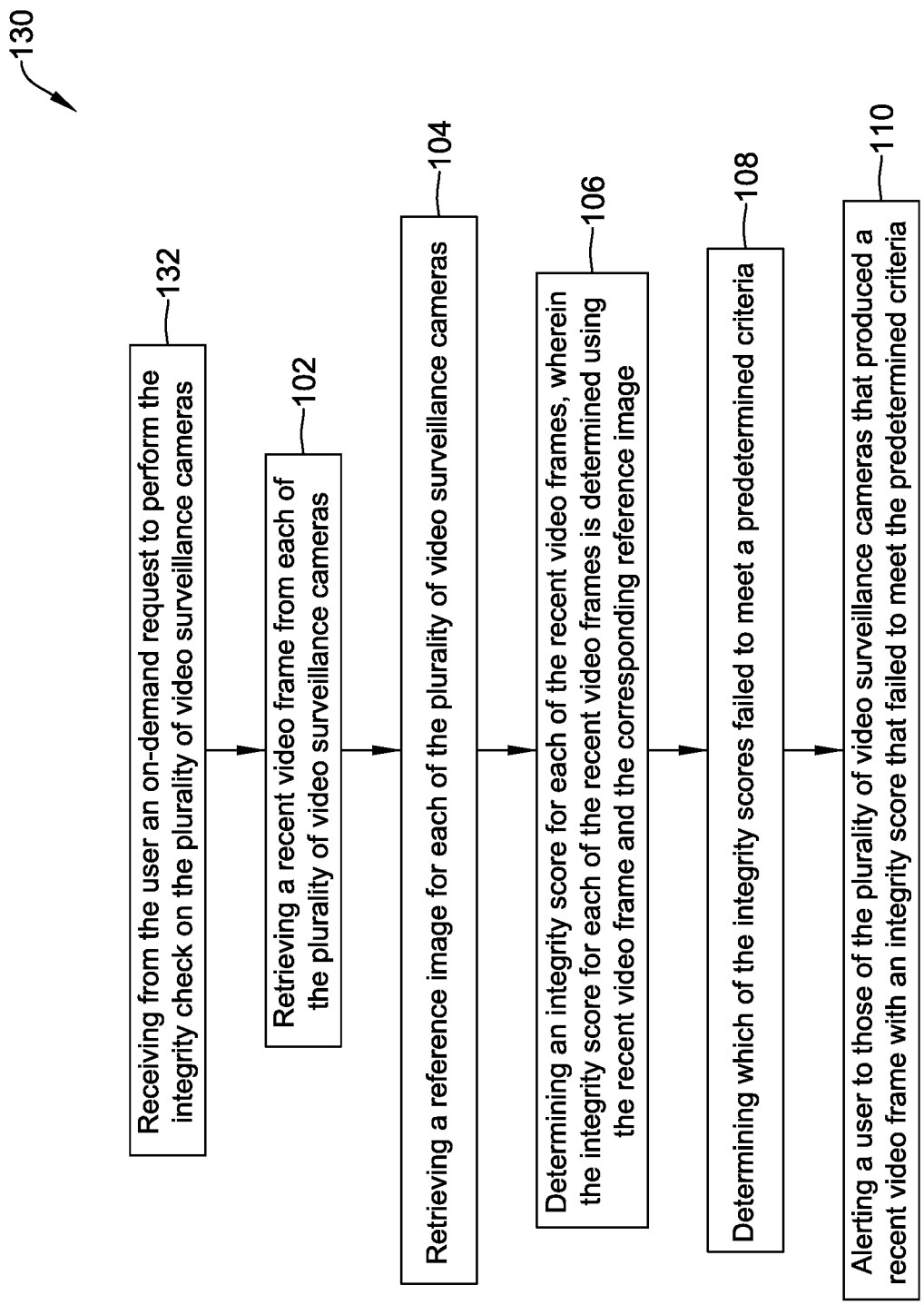
FIG. 10 is a flow diagram showing an illustrative method that may be carried out via the illustrative video surveillance system of FIG. 1.

FIG. 10 is a flow diagram showing an illustrative method 130 of performing an integrity check on a plurality of video surveillance cameras 12. An on-demand request to perform an integrity check on the plurality of video surveillance cameras 12 may be received, as indicated at block 132. A recent video frame may be retrieved from each of the plurality of video surveillance cameras 12, as indicated at block 102. A reference image may be retrieved for each of the plurality of video surveillance cameras 12, as indicated at block 104. An integrity score may be determined for each of the recent video frames, as indicated at block 106, wherein the integrity score for each of the recent video frames may be determined using the recent video frame and the corresponding reference image. As indicated at block 108, determining which of the integrity scores failed to meet a predetermined criteria may be determined. As noted at block 110, a user may be alerted to those of the plurality of video surveillance cameras that produced a recent video frame with an integrity score that failed to meet the predetermined criteria.

Figure 11:
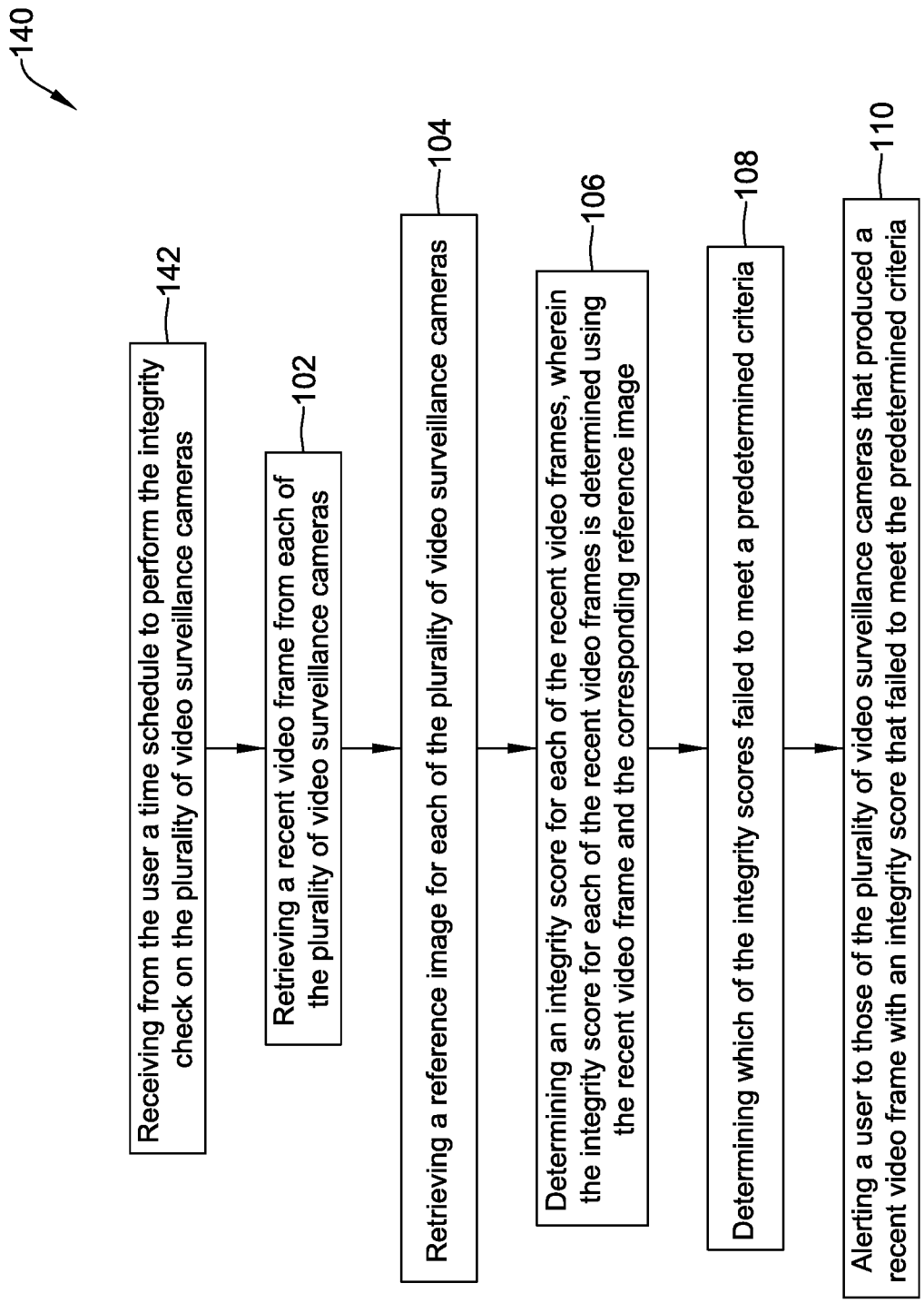
FIG. 11 is a flow diagram showing an illustrative method that may be carried out via the illustrative video surveillance system of FIG. 1.

FIG. 11 is a flow diagram showing an illustrative method 140 of performing an integrity check on a plurality of video surveillance cameras 12. A time schedule for performing an integrity check on the plurality of video surveillance cameras 12 may be received from a user, as indicated at block 142. A recent video frame may be retrieved from each of the plurality of video surveillance cameras 12, as indicated at block 102. A reference image may be retrieved for each of the plurality of video surveillance cameras 12, as indicated at block 104. An integrity score may be determined for each of the recent video frames, as indicated at block 106, wherein the integrity score for each of the recent video frames may be determined using the recent video frame and the corresponding reference image. As indicated at block 108, determining which of the integrity scores failed to meet a predetermined criteria may be determined. As noted at block 110, a user may be alerted to those of the plurality of video surveillance cameras that produced a recent video frame with an integrity score that failed to meet the predetermined criteria.

Figure 12:
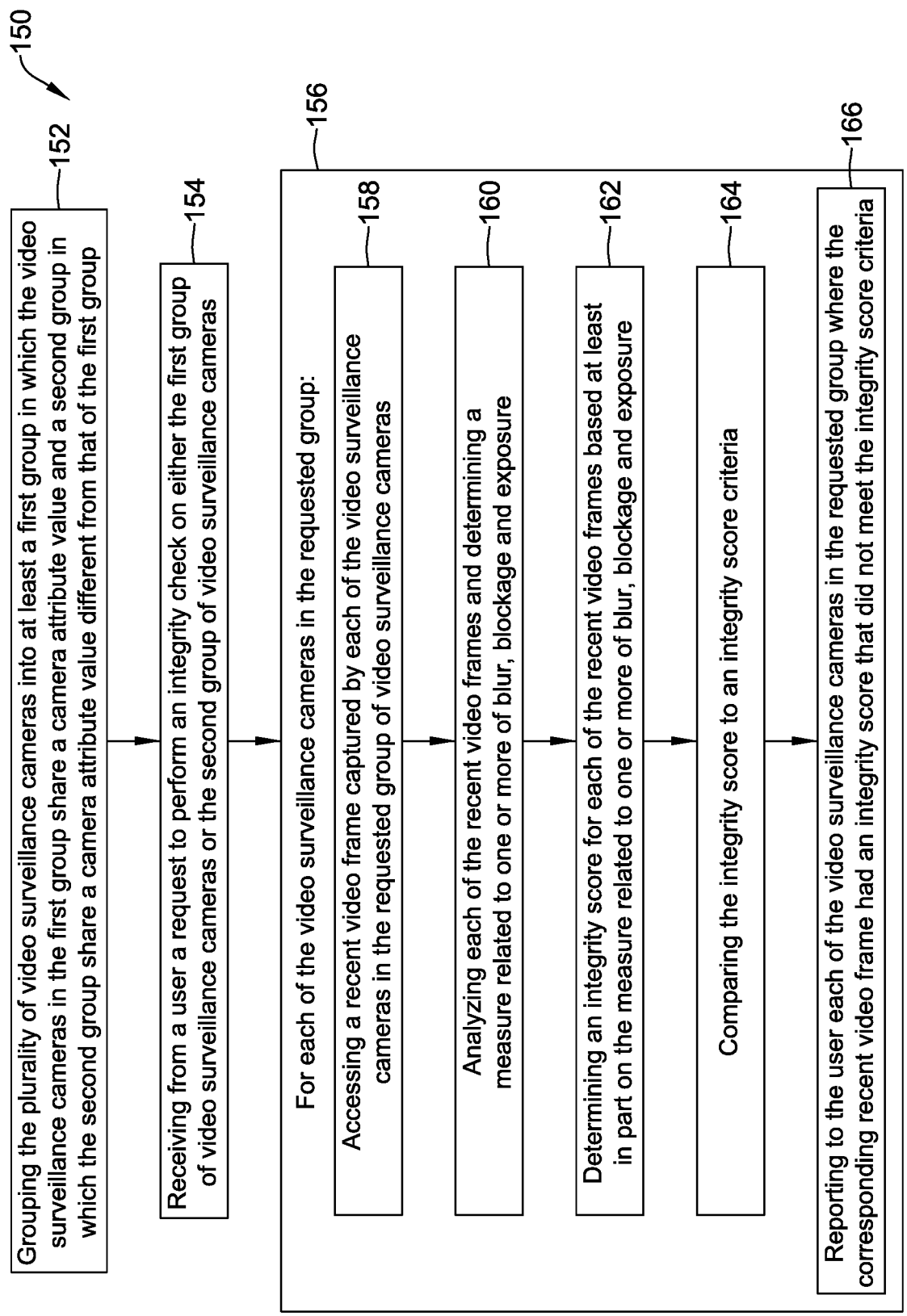
FIG. 12 is a flow diagram showing an illustrative method that may be carried out via the illustrative video surveillance system of FIG. 1.

FIG. 12 is a flow diagram showing a method 150 of performing on-demand integrity checks on a plurality of video surveillance cameras, each of the plurality of video surveillance cameras having a camera attribute value. The camera attribute value may represent a camera mounting location, for example. In some cases, the camera attribute value may represent a camera priority. In some cases, the camera attribute value may represent a camera type. In some cases, the camera attribute value may represent how long a particular camera has been installed, with the idea being that the longer a camera is in position, dust and other issues can accumulate. These are just examples.

The plurality of video surveillance cameras are grouped into at least a first group in which the video surveillance cameras in the first group share a camera attribute value and a second group in which the second group share a camera attribute value different from that of the first group, as indicated at block 152. A request may be received from a user to perform an integrity check on either the first group of video surveillance cameras 12 or the second group of video surveillance cameras 12, as indicated at block 154. As generally indicated at block 156, a number of steps are performed for each of the video surveillance cameras 12 in the requested group. A recent video frame captured by each of the video surveillance cameras 12 in the requested group of video surveillance cameras 12 is accessed, as indicated at block 158. In some instances, the recent video frames may be captured by each of the video surveillance cameras 12 within 24 hours or less, or 12 hours or less, or 6 hours or less, of the request to perform the integrity check.

Each of the recent video frames is analyzed in order to determine a measure related to one or more of blur, blockage and exposure, as indicated at block 160. An integrity score is determined for each of the recent video frames based at least in part on the measure related to one or more of blur, blockage and exposure, as indicated at block 162. The integrity score is compared to an integrity score criteria, as indicated at block 164. As noted at block 166, the method 150 includes reporting to the user each of the video surveillance cameras 12 in the requested group where the corresponding recent video frame had an integrity score that did not meet the integrity score criteria.

In some cases, the integrity score may also be based at least in part upon a field of view score. For example, an initial field of view video frame may be stored for each of the cameras 12 during the initial initialization of that camera 12. The initial field of view video frame provides an indication of what the camera 12 should be seeing. If the camera 12 has shifted over time, comparing a current field of view video frame to the initial field of view video frame may indicate that the camera 12 has indeed shifted, and may provide an indication of how much the camera 12 has shifted, and in what direction. As a result, a user may be informed as to how a particular camera 12 should be adjusted in order to correct its current field of view to more closely approximate its original field of view.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of performing on-demand integrity checks on a plurality of video surveillance cameras, each of the plurality of video surveillance cameras having a camera attribute, the method comprising:

grouping the plurality of video surveillance cameras into at least a first group in which the video surveillance cameras in the first group share a camera attribute value and a second group in which the second group share a camera attribute value different from that of the first group;

receiving from a user a request to perform an integrity check on the first group of video surveillance cameras while not performing the integrity check on the second group of video surveillance cameras;

in response to receiving from the user the request to perform the integrity check on the first group of video surveillance cameras while not performing the integrity check on the second group of video surveillance cameras:

accessing a recent video frame captured by each of the video surveillance cameras in the first group of video surveillance cameras;

analyzing each of the recent video frames and determining a measure related to one or more of blur, blockage and exposure;

determining an integrity score for each of the recent video frames based at least in part on the measure related to one or more of blur, blockage and exposure;

comparing the integrity score to an integrity score criteria; and reporting to the user each of the video surveillance cameras in the first group where the corresponding recent video frame had an integrity score that did not meet the integrity score criteria.

2. The method of claim 1, wherein the recent video frames are captured by each of the video surveillance cameras in the first group less than or equal to 24 hours prior to the request.

3. The method of claim 1, wherein the camera attribute value represents a camera mounting location and/or a camera priority.

4. The method of claim 1, wherein determining an integrity score for each of the recent video frames comprises a weighted summation of one or more of a blur score, a blockage score and an exposure score.

5. The method of claim 1, wherein reporting to the user each of the video surveillance cameras in the first group where the corresponding recent video frame had an integrity score that did not meet the integrity score criteria comprises:

creating an integrity check report, the integrity check report including a camera identifier along with the recent video frame for each of the video surveillance cameras in the first group where the corresponding recent video frame had an integrity score that did not meet the integrity score criteria; and displaying the integrity check report to a user.

6. The method of claim 5, further comprising:

identifying a reason that the integrity score failed to meet the predetermined criteria for each of the video surveillance cameras in the first group where the corresponding recent video frame had an integrity score that did not meet the integrity score criteria; and wherein the integrity check report includes the camera identifier, the reason, and the recent video frame for each of the video surveillance cameras in the first group where the corresponding recent video frame had an integrity score that did not meet the integrity score criteria.

7. The method of claim 6, wherein the reason comprises one or more of blur, blockage, and exposure.

8. The method of claim 1, further comprising:

analyzing each of the recent video frames and determining a measure related to miss-alignment; and determining an integrity score for each of the recent video frames based at least in part on the measure related to one or more of blur, blockage, exposure and miss-alignment.

9. The method of claim 1, further comprising:

receiving from the user a request to perform an integrity check on the second group of video surveillance cameras while not performing the integrity check on the first group of video surveillance cameras;

in response to receiving from the user the request to perform the integrity check on the second group of video surveillance cameras while not performing the integrity check on the first group of video surveillance cameras:

accessing a recent video frame captured by each of the video surveillance cameras in the second group of video surveillance cameras;

analyzing each of the recent video frames captured by each of the video surveillance cameras in the second group of video surveillance cameras and determining a measure related to one or more of blur, blockage and exposure;

determining an integrity score for each of the recent video frames captured by each of the video surveillance cameras in the second group of video surveillance cameras based at least in part on the measure related to one or more of blur, blockage and exposure;

comparing the integrity score for each of the recent video frames captured by each of the video surveillance cameras in the second group of video surveillance cameras to the integrity score criteria; and reporting to the user each of the video surveillance cameras in the second group where the corresponding recent video frame had an integrity score that did not meet the integrity score criteria.

* * * * *